(12) United States Patent
Lee

(10) Patent No.: US 6,187,185 B1
(45) Date of Patent: Feb. 13, 2001

(54) FILTER ARRANGEMENT FOR LIQUIDS

(75) Inventor: Brian Thomas Lee, Charlotte, NC (US)

(73) Assignee: Dana Corporation, Toleda, OH (US)

( * ) Notice: Under 35 U.S.C. 154(b), the term of this patent shall be extended for 0 days.

(21) Appl. No.: 09/480,476

(22) Filed: Jan. 11, 2000

(51) Int. Cl.[7] ............... B01D 35/02; B01D 36/04; B01D 29/07
(52) U.S. Cl. ............ 210/168; 210/172; 210/299; 210/305; 210/474; 184/6.24
(58) Field of Search .................. 210/168, 172, 210/305, 474, 299; 184/6.24

(56) References Cited

U.S. PATENT DOCUMENTS

| | | |
|---|---|---|
| 1,230,478 | 6/1917 | Greer . |
| 1,623,728 | 4/1927 | Hooton . |
| 1,662,963 | 3/1928 | Eastman . |
| 1,761,930 | 6/1930 | McCuen . |
| 2,577,188 | * 12/1951 | Hall . |
| 2,767,736 | * 10/1956 | Lackinger . |
| 3,168,468 | 2/1965 | Jagdmann . |
| 3,480,149 | 11/1969 | Houser . |
| 3,784,011 | 1/1974 | Ward . |
| 4,348,864 | * 9/1982 | Ichimura . |
| 4,402,827 | 9/1983 | Joseph . |
| 5,766,472 | * 6/1998 | Tzakis . |

* cited by examiner

Primary Examiner—Thomas M. Lithgow
(74) Attorney, Agent, or Firm—Millen, White, Zelano & Branigan, P.C.

(57) ABSTRACT

The dirt holding capacity of the filter is increased by providing one or more areas for the particles to settle and remain out of suspension on the filter so that the particles are not carried through a filter media disposed in the filter. The areas may be provided by recessed pockets, chambers or downwardly sloping floors which end in gutters. This arrangement is useful in transmissions and engine lubricating arrangements wherein oil is accumulated in and recirculates from an oil pan. With these arrangements, the filter is in the form of a panel having an opening therethrough, wherein the panel is disposed within an oil pan in spaced relation to the bottom of the oil pan.

11 Claims, 2 Drawing Sheets

FILTER ARRANGEMENT FOR LIQUIDS

FIELD OF THE INVENTION

The present invention is directed to a filter arrangement for liquids, and more particularly, the present invention is directed to a filter arrangement for filtering liquids, such as but not limited to, transmission oil and engine lubricating oil in which oil is collected in an oil pan prior to recirculation.

BACKGROUND OF THE INVENTION

In automatic transmissions, oil is circulated by a pump and used as a medium through which power is transmitted from an engine to driven components, such as vehicle wheels. Internal combustion engines use lubricating oil to provide a film of oil between opposing surfaces of components which have relative motion. In both cases, the oil entrains particulates which can damage the surfaces of the components. In both cases, it is necessary to remove the particulates in order to prolong the life of the transmission or engine. This is generally accomplished by a filter media which is porous in order to let liquid pass through but traps particulates on a "dirty side" of the filter media. One way to increase the useful life of a filter is to increase the dirt holding capacity of the filter by reducing the amount of dirt which must be trapped by the filter media.

One arrangement for a filter element which includes a filter media is to provide a panel having an opening therethrough in which the filter media is mounted. The panel is mounted in an oil pan between the bottom of the oil pan and the transmission case when the oil being filtered is transmission oil, or between an engine block and lubricating oil pan when the oil being filtered is lubricating oil. A primary interest is filtering transmission oil. In currently known arrangements, substantially all particulate matter is removed by the filter media itself, thus loading the filter media with all of the particulates removed from the oil. This, of course, limits the holding capacity of the entire filter to the amount of particulate matter which can be retained by the filter media itself.

SUMMARY OF THE INVENTION

In view of the aforementioned considerations, it is a feature of the present invention to provide a filter, having a filter media wherein the dirt holding capacity of the filter is not limited only by the dirt holding capacity of the filter media.

In view of this feature and other features, the present invention is directed to an arrangement for removing contaminants from oil which is collected and recirculated from a sump pan, wherein the arrangement includes a panel adapted to be mounted in the pan in spaced relation to the floor of the pan to define an oil collection chamber between the panel and floor. The panel has an upper surface and a lower surface with an opening therethrough which has a filter media therein. The upper surface of the panel has at least one baffle arrangement thereon which inhibits oil from flowing laterally over the panel toward the filter media thereby defining at least one area in which particulate matter which has settled out of the oil from becoming resuspended in the oil and carried toward the filter media so as to become trapped on the dirty side of the filter media.

In more specific aspects of the invention, the baffle arrangement is provided by a plurality of indentations in the panel; by raised walls on the panel which define at least one chamber; or by at least one downwardly sloping surface sloping away from the filter media toward a peripheral gutter. In each case, these baffle arrangements provide areas where particulate matter may settle onto the panel and be discouraged from being resuspended by turbulence and then swept onto the dirty side of the filter media while the fluid is being pumped.

In accordance with one embodiment of the invention, the pan is a transmission oil pan and in accordance with another specific embodiment of the invention, the pan is a lubricating oil pan.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein:

FIG. 5 is a side elevation of the arrangement shown in FIGS. 1 and 2 showing particulates settled out of a quiescent liquid prior to;

DETAILED DESCRIPTION

Figure 1:
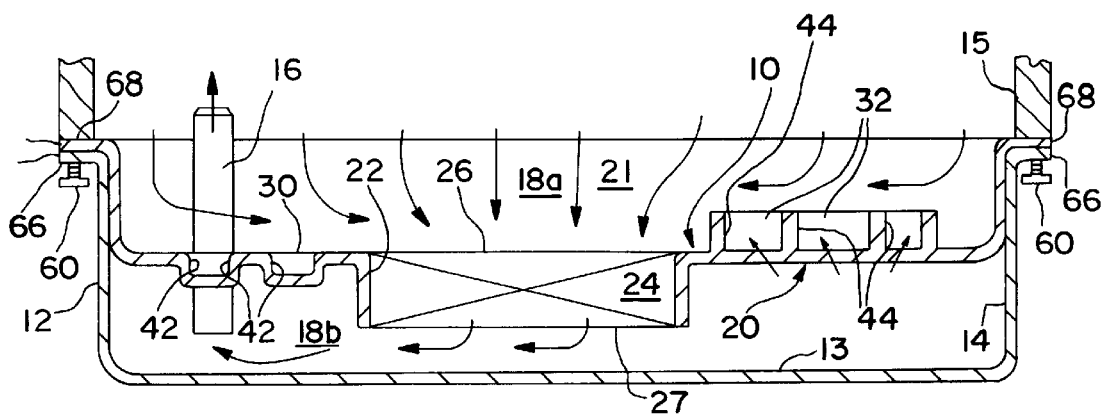
FIG. 1 is a side elevation of a filter arrangement in accordance with the present invention mounted in a transmission oil pan (or optionally in a lubricating oil pan)

Referring now to FIG. 1, there is shown a filter arrangement 10 in accordance with the present invention wherein the filter arrangement 10 is mounted within a sump pan 12 having a floor 13 and a side wall 14 that is in accordance with one embodiment of the invention secured to the bottom of a transmission case 15. The transmission case 15 includes a transmission pump (not shown) which is connected to a suction tube 16 for recirculating transmission fluid 18 from a lower collection chamber 19 in the sump pan 12 to an automatic transmission (not shown).

The filter arrangement 10 is in the form of a panel 20 which separates the sump pan into the lower collection chamber 19 and an upper chamber 21. The panel 20 has an opening 22 therethrough in which is seated a filter media 24.

Figure 2:
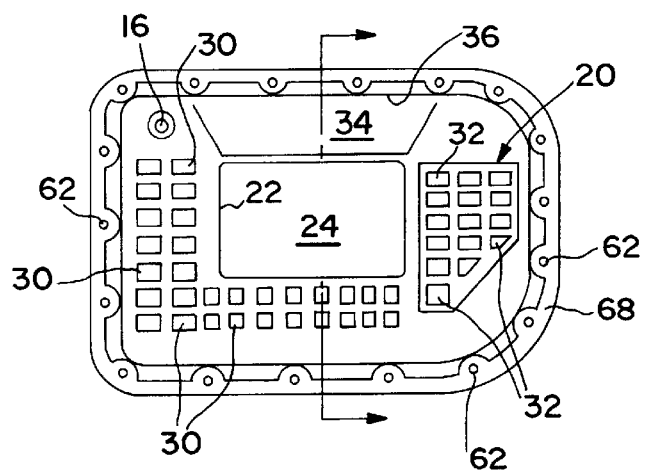
FIG. 2 is a top view of the filter arrangement of FIG. 1.

The filter media 24 has a "dirty side" 26 which traps particulate matter which is entrained or suspended in the dirty transmission oil 18a so that transmission oil 18 on the clean side 27 of the filter media is clean transmission oil 18b that is recirculated by the suction tube 16. As is seen in FIGS. 1 and 2, the panel 20 includes a particle collection arrangement around the periphery of the opening 22 through the panel. The particle collection arrangement includes one or more of the following structures: a plurality of recessed pockets 30; a plurality of raised chambers 32; and/or one or more downwardly sloping surfaces 34 ending in a gutter 36 adjacent the sidewall 38 of the panel 20. As will be explained hereinafter, when the device such as a motor vehicle (not shown) which is utilizing the transmission pan and filter arrangement 10 is at rest and when the transmission is not operating, particles which are too heavy to be held in suspension sink to the bottom of whichever chamber 19 or 21 the oil is sitting in. Since the filter media 24 has removed larger particles from the dirty fluid 18a, the fluid 18b in the lower chamber has few if any larger particles therein, whereas the fluid 18a in the upper chamber may have a relatively large number of large particles which tend to settle on the upper surfaces presented by the panel 20, which upper surfaces include the bottoms of the pockets 30, the bottoms of the chamber 32, and the sloping surface 34.

Figure 3:
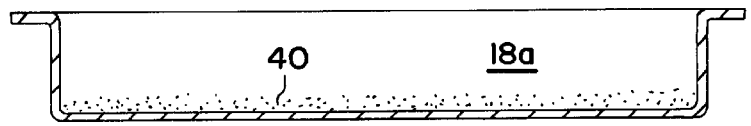
FIG. 3 is a side elevation illustrating the settling of particulate matter from a quiescent liquid utilizing prior art structures.
Figure 4:
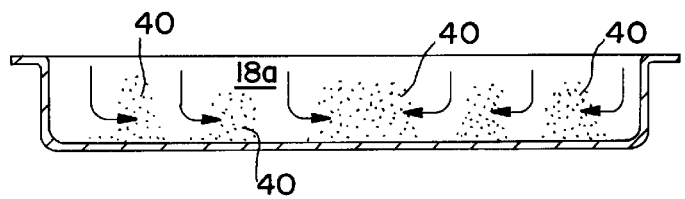
FIG. 4 is a side elevation illustrating the entrainment of settled particulates in a turbulent liquid with prior art structures.

Normally, large particulates 40 settle out of dirty fluid 18a as is seen in prior art FIGS. 3 and 4 and are thereafter agitated by turbulence and resuspended in the dirty fluid 18a when the fluid is being pumped so as to become entrained therein. The resuspended particulates 40 are then carried to the filter media 24 and filtered out by the filter media. This of course causes loading of the filter media with particles which have already been separated from the dirty fluid 18a.

Figure 5:
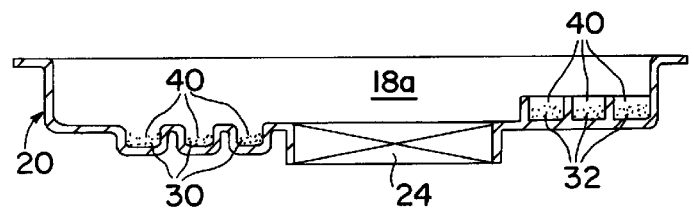
Figure 6:
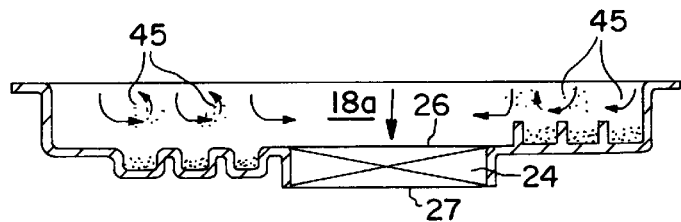
FIG. 6 is a side view showing a substantial quantity of settled particulates remaining in place while liquid is flowing and creating turbulence in the arrangement of FIGS. 1 and 2.
Figure 7:
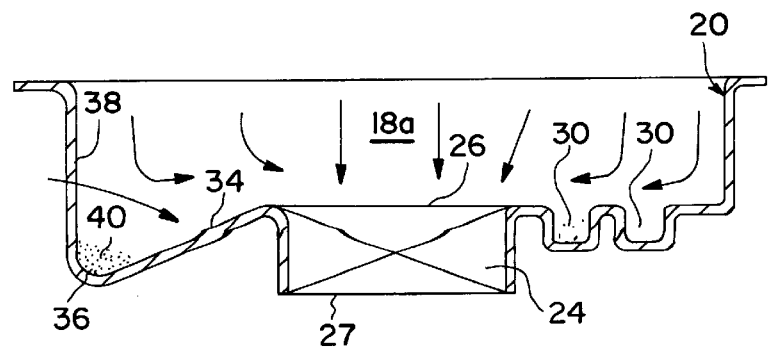
FIG. 7 is a side elevation showing a flow pattern over and through a panel configured in accordance with the present invention and showing a floor portion sloping away from a filter media.

In accordance with the present invention, as is seen in FIGS. 5–7, the particulates 40 first settle out of the dirty fluid 18a in pockets 30 and in chambers 32 as is seen in FIG. 5 when the dirty fluid 18a is quiescent. When the dirty fluid 18a is being pumped and sucked through the tube 16, vertical walls 42 and 44 which define the pockets 30 and chambers 32 act as baffles to retain a substantial portion of the particulates 40 behind the walls 42 and 44 while only a small portion of the particulates are resuspended by turbulence 45 and carried through to the filter media 24.

As is seen in FIG. 7, where sloped wall 34 and gutter 36 are shown, particulates settling out of the dirty fluid 11 a accumulate in the gutter 36 so as not to be entrained and carried to rest on the dirty side of the filter 24. The sloping floor 34 can extend completely around the hole 22 which receives the filter media 24 so that particulates 40 will tend to accumulate in the gutter 36 at a location laterally displaced in the filter media 22 by a substantial distance. With the present filter arrangement 10, the recessed pockets 30, the chambers 32 and the gutter or gutters 36 minimize reintroduction of settled particulates due to stirring up at start-up of the flow of dirty fluid 18a through the filter media 24. Generally, even when the vehicle is operating, particles too heavy to be held in suspension tend to fall onto the surface of the panel 20 comprising the filter and when the vehicle or other device ceases operation, all of the remaining heavy particles held in suspension in the liquid 18a settles onto the upper surface of the panel. By accumulating the particles in areas which are less turbulent, such as the recessed pockets 30, chambers 32 and gutter 36, the particles are located in areas where there is less turbulence and therefore are not stirred by flowing liquid.

When it is necessary to change the filter 10, which usually occurs during standardized maintenance intervals, the filter arrangement 10 is removed with the filter media 24, recessed pockets 30, chambers 32 and gutters 36 containing the particulates 40 which have been removed from the liquid 18 deposited in the oil filter arrangement 10. The filter arrangement 10 is then replaced with a new filter arrangement for filtering fresh transmission oil if the arrangement 10 is used with a transmission or with fresh lubricating oil if the filter arrangement is being used with a lubricating oil pan. Normally, both the filter arrangement 10 and the sump pan 12 are secured to one another and to the device upon which they are mounted by bolts 60 (or threaded lugs with nuts) which pass through holes 62 and 64 in peripheral flanges 66 and 68 of the panel 20 and the sump pan 12, respectively. Alternatively, the sump pan 12 and panel 20 are integral so as to be removeable and replaceable as a unit.

The filter arrangement 10 can of course be used for other purposes, such as perhaps, a cooling system for an engine or any other arrangement in which a sump is used in combination with a liquid pump and filter media.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

What is claimed is:

1. An arrangement for removing contaminants from a liquid which is collected and recirculated from a sump pan having a floor and an upwardly extending, side wall defining the depth of the pan, the arrangement comprising:

a panel adapted to be mounted in the pan in spaced relation to the floor of the pan to define a liquid collection chamber between the panel and the floor, the panel having an opening therethrough;

a filter media disposed in the opening for filtering liquid passing through the opening to the collection chamber, and a plurality of upwardly opening chambers in the panel, the chambers each having a bottom and walls with at least a vertical component adapted to resist liquid flow toward the opening, and the chambers defining a portion of the panel adapted to retain particulates which have settled out of the liquid so as to keep those particles from clogging the filter media thereby extending the useful life of the filter media.

2. The arrangement of claim 1, wherein the chambers comprise recessed pockets formed in the panel.

3. The arrangement of claim 1, wherein the chambers are defined by walls which extend above the opening.

4. The arrangement of claim 1, wherein there are a plurality of walls which extend beneath the panel to define a plurality of recessed pockets and a plurality of walls which extend above the panel to define a plurality of vertically projecting chambers.

5. The arrangement of claim 1 wherein there is a single opening extending through the panel.

6. The arrangement of claim 1, further including a baffle defined by at least one portion of the panel which slopes downwardly and away from the opening to a gutter, which gutter collects particulates settling out of the liquid.

7. The arrangement of claim 1, further including a suction tube extending through the panel for pulling filtered liquid from the liquid collection chamber.

8. The arrangement of claim 1, wherein the panel includes:

a side wall having a height less than the depth of the pan wherein an upper chamber is defined by the side wall and the panel.

9. The arrangement of claim 8, wherein the side wall of the panel has a laterally extending flange which overlies a top peripheral flange of the pan used to retain the panel within the pan in spaced relation with the floor of the pan.

10. The arrangement of claim 1, wherein the liquid is transmission oil and wherein the sump pan and panel are adapted for mounting on a transmission.

11. The arrangement of claim 1, wherein the liquid is lubricating oil and wherein the sump pan and panel are adapted for mounting on an internal combustion engine.

* * * * *